United States Patent [19]

Tanaka

[11] 4,026,494
[45] May 31, 1977

[54] SAFETY BELT TENSION REDUCING MEANS

[75] Inventor: Akira Tanaka, Northridge, Calif.

[73] Assignee: American Safety Equipment Corporation, Encino, Calif.

[22] Filed: Apr. 26, 1976

[21] Appl. No.: 680,111

[52] U.S. Cl. .................... 242/107; 242/107.4 R
[51] Int. Cl.² ................ A62B 35/02; B65H 75/48
[58] Field of Search .............. 242/107–107.7; 280/744–747; 297/388; 185/9–14

[56] References Cited

UNITED STATES PATENTS

| | | | |
|---|---|---|---|
| 3,834,646 | 9/1974 | Heath | 242/107.7 |
| 3,880,364 | 4/1975 | Andres | 242/107.4 R |
| 3,957,222 | 5/1976 | Bladh | 242/107 |
| 3,957,283 | 5/1976 | Pocobello | 242/107.4 R X |

Primary Examiner—George F. Mautz
Assistant Examiner—John M. Jillions
Attorney, Agent, or Firm—Poms, Smith, Lande & Glenny

[57] ABSTRACT

A safety belt retractor has a belt storage reel biased toward a belt wound condition, an emergency locking means for preventing a further unwinding movement of the belt when it is unwound to a position of use and an emergency condition exists and an improvement in belt tension reducing means for reducing the tension of the belt when in use due to the rewinding bias of the reel. The improved belt tension reducing means includes counterbiasing spring means for biasing the reel in a belt unwinding direction when connected thereto and means for releasably connecting the counterbiasing means and the reel in response to belt movement during protraction and retraction. Ratchet means connected to the reel are adapted to be engaged by pawl means pivotally mounted on a pawl carrier means which is in turn rotatably mounted to the retractor and biased counter to the reel bias by the counterbiasing spring. Frictionally driven camming disc means are provided for deactivating the pawl means to prevent the connection between the counterbiasing spring and reel through the pawl carrier, pawl means and ratchet means until there is a slight retraction movement of the webbing following a protraction thereof toward a position of use.

10 Claims, 9 Drawing Figures

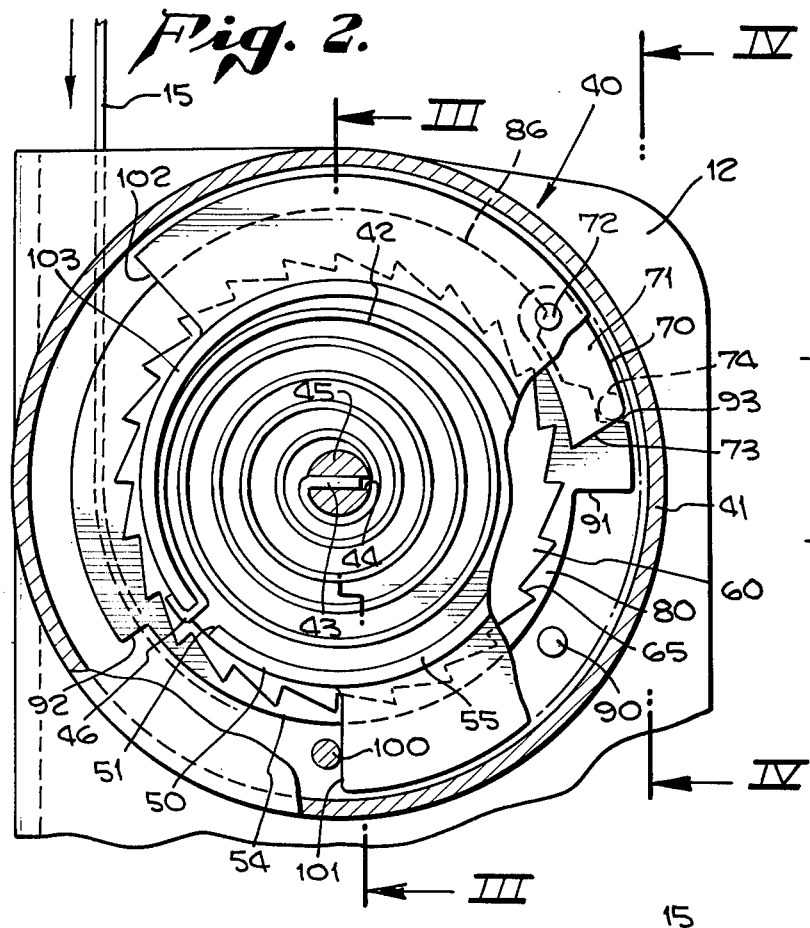

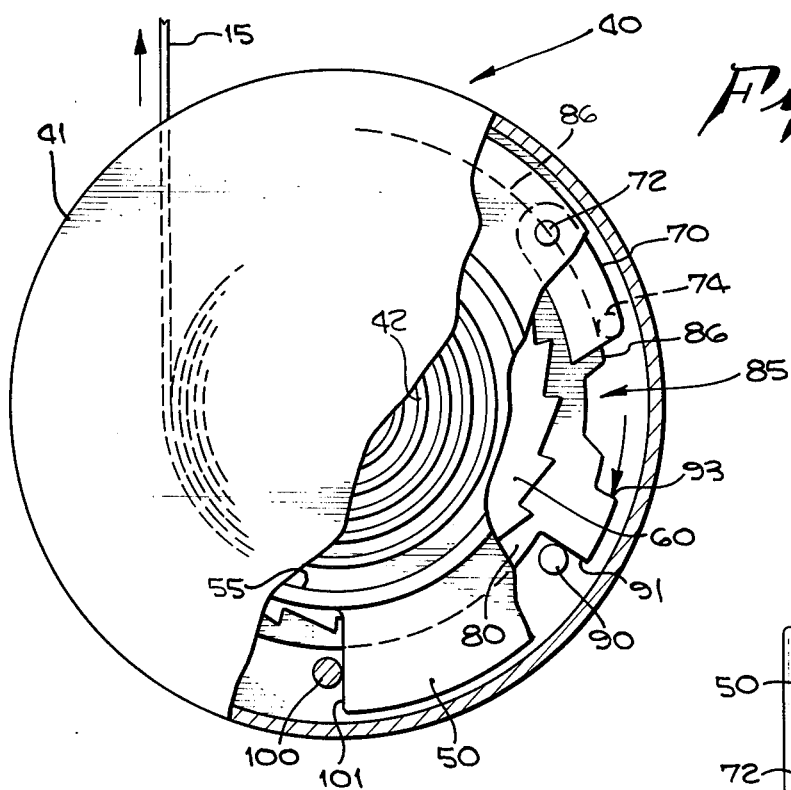
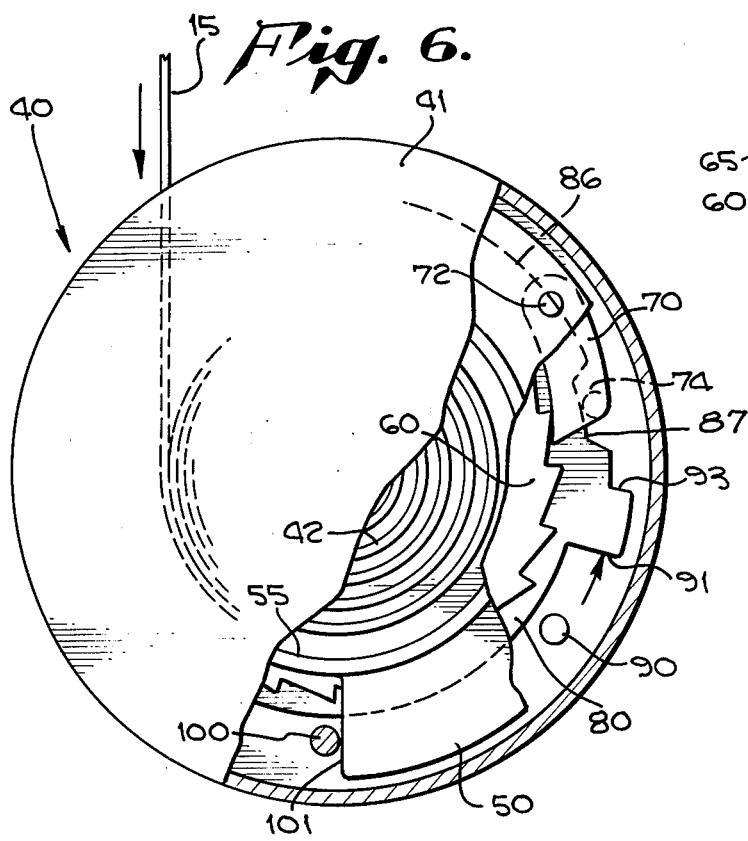
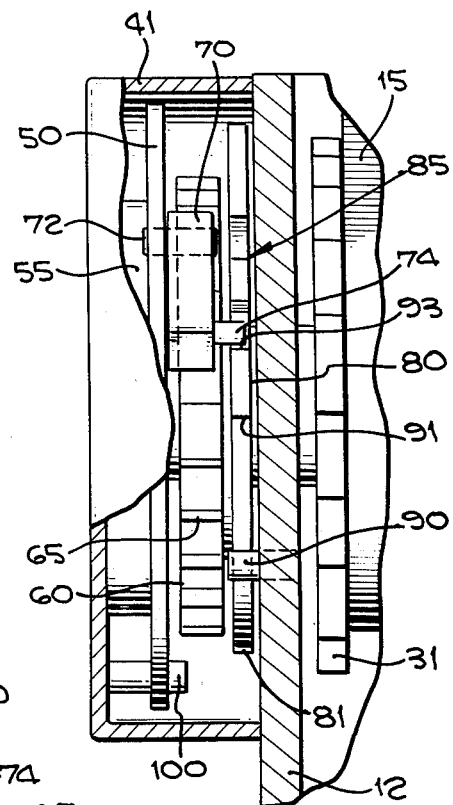

SAFETY BELT TENSION REDUCING MEANS

BACKGROUND OF THE INVENTION

This invention relates in general to means for reducing the belt tension in a safety belt applied by the retractor rewind spring when the belt is in use. More specifically, the present invention relates to counterbiasing means for biasing the retractor reel in a belt unwinding direction when connected thereto and means for releasably connecting the counterbiasing means to the reel when desired to produce a belt tension reduced condition.

Various means have been provided in safety belt retractors heretofore for relieving or reducing the belt tensioning effect of the rewind spring on the belt when the belt is placed in use. It is common practice in the automotive industry presently to utilize safety belt retractors which employ retractor locking means sensitive to a change in vehicle inertia and/or an acceleration of the safety belt webbing off of the retractor of an amount in excess of a predetermined amount. In these types of emergency locking retractors, the seat belt is normally free to move inwardly and outwardly of the retractor, under the bias of the rewind spring of the retractor, during normal movements of the vehicle occupant about which the safety belt is placed when in use. The normal rewind springs employed generally have an increasing tensioning affect as the belt is protracted to a position of use increasing the possibly objectionable affect of the belt tensioning upon the occupant wearing a safety harness or a seat belt including such safety belt.

Exemplary of prior means for reducing the tension on a safety belt is that in U.S. Pat. No. 3,834,646 (Heath). In the Heath patent, the belt tension relieving means holds the retractor reel against rewind when the tension relieving means is activated until the safety belt is protracted further. In addition, the belt must be initially protracted, then retracted and then protracted once again to place the tension relieving means in operation. While this produces an effective tension relieving means, it has been found to be desirable to have a tension reducing means, as opposed to the relieving means of the Heath patent, and which is activated on a simpler belt manipulation.

An improvement in safety belt tension reducing means is disclosed in the co-pending U.S. patent application Ser. No. 627,875 filed Oct. 31, 1975 (Ulrich) which provides for a limited low tension travel of the webbing while in a low tension condition and which includes means for automatic setting and deactivating of the tension relieving means in response to normal manipulation of the safety belt to place it in use. In the exemplary embodiment of that application, however, the limited low tension travel for the seat belt is provided for by tension arm means pivotally mounted to the retractor and extending partially outwardly of the retractor frame for lateral engagement and movement of the safety belt webbing during the low tension travel provided therefor. This approach for a tension relieving means, while effective, introduces various complexities into the construction of the retractor, and its housing, which tend to increase the costs of manufacture thereof as well as integration into a vehicle safety belt harness installation.

SUMMARY OF THE INVENTION

It is therefore the primary object of the present invention to disclose and provide an improvement in safety belt tension reducing means for emergency locking retractors wherein the belt tension reducing means is more economically and simply incorporated into the emergency locking retractor than has been achieved in prior tension relieving and tension reducing means for such retractors.

It is a further object of the present invention to disclose and provide an improvement in belt tension reducing for an emergency locking type safety belt retractor which effectively operates to reduce seat belt tension when activated on a simple manipulation of the seat belt independently of and without affecting the otherwise normal movement of the webbing and associated reel during lock up under emergency conditions causing retractor lock up.

Generally stated, the within invention includes the provision of counterbiasing means for biasing the retractor safety belt storage reel in a belt protracting, or unwinding, direction and means for selectively and releasably connecting such counterbiasing means to the reel for reducing the belt tensioning applied by the reel rewind spring in an amount determined by the counterbiasing means force upon a normal manipulation of the seat belt by the occupant to place it in use. More specifically, the counterbiasing means in accordance with the present invention comprises spring means mounted to the retractor to apply an anti-or counterbiasing effect upon the reel relative to the rewind spring. The means for releasably connecting such counterbiasing spring to the reel more specifically includes ratchet means connected to the reel for rotation therewith, pawl carrier means rotatably mounted on the retractor and engaged by the counterbiasing spring and a pawl means pivotally mounted on the pawl carrier means for selective engagement with the ratchet means to impart the counterbiasing force of the counterbiasing spring through the pawl carrier means, pawl means and ratchet means to the retractor reel. The selective connection of the counterbiasing spring wth the reel is accomplished in accordance with the present invention by pawl deactivating means including a camming disc frictionally driven off of the ratchet means to selectively control the engagement or disengagement of the pawl means with the ratchet means upon the normal protraction and retraction movements of the seat belt to place it in use.

A more complete understanding of the present improvement in tension reducing means will be afforded to those skilled in the art from a consideration of the following detailed desription of a preferred exemplary embodiment thereof. Reference will be made to the appended sheets of drawings which will first be described briefly.

BRIEF DESCRIPTION OF THE DRAWINGS

FIG. 1 is a plan view of an exemplary embodiment of safety belt retractor of the emergency locking type having an exemplary embodiment of belt tension reducing means in accordance with the present invention;

FIG. 2 is an enlarged side detail view of the safety belt retractor of FIG. 1 taken therein along the plane II—II with portions thereof broken away to show details of the exemplary embodiment in belt tension reducing means according to the present invention;

FIG. 3 is a vertical section view of the safety belt retractor of FIGS. 1 and 2 taken along the plane III—III in FIG. 2;

FIG. 4 is a detail side view, partially in section, of the exemplary embodiment of belt tension reducing means taken in FIG. 2 along the plane IV—IV;

FIG. 5 is a detail view, partially in section, of the exemplary embodiment of the belt tension reducing means of FIGS. 1 through 4 showing the belt tension reducing means during an initial unwinding or protraction of the safety belt webbing with the belt tension reducing means in a deactivated condition;

FIG. 6 is a view as in FIG. 5 showing the belt tension reducing means moved into an activated condition to reduce belt tension in response to a slight unwinding or retraction movement of the webbing following the protraction movement thereof in FIG. 5;

DETAILED DESCRIPTION OF THE PREFERRED EXEMPLARY EMODIMENT

Figure 7:
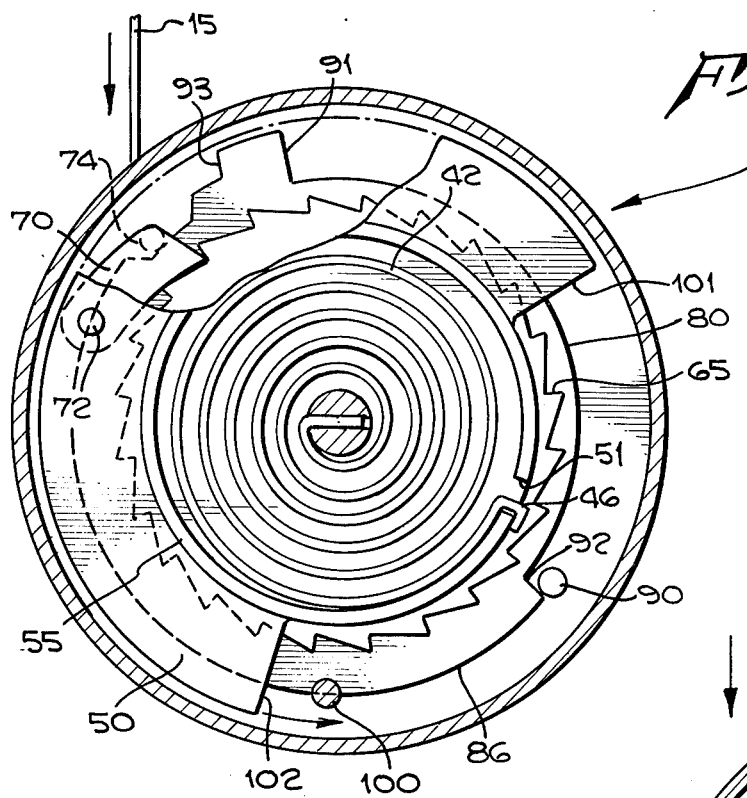
FIG. 7 is a view as in FIG. 6 showing the exemplary embodiment of belt tension reducing means in the activated condition of FIG. 6 during a still further rewind or retraction movement of the belt or webbing within a predetermined limit therefor.

Referring initially to FIG. 1, an exemplary embodiment of an emergency locking safety belt retractor, indicated generally at 10, is illustrated in which the improvement in belt tension reducing means in accordance with the present invention may be utilized. It should be understood that the present invention in belt tension reducing means may be used with various types of emergency locking retractors and that the retractor illustrated generally at 10 in FIG. 1 is exemplary thereof.

The exemplary emergency locking retractor, indicated generally at 10, as seen in FIG. 1, includes a conventional U-shaped frame including a base 11 with a pair of spaced side walls 12 and 13. Base 11 is provided with a mounting aperture 14 to facilitate bolting the retractor to a location of use in the vehicle in conventional manner. As is also conventional, the retractor has belt storage means for storing the seat belt webbing 15.

Referring now also to FIG. 3, the exemplary embodiment of webbing storage means includes a reel or drum 16 having a reel shaft 17 journaled by appropriate bushings 18 and 19 to the retractor side walls 12 and 13. The belt storage reel 16 is biased into a wound or belt retracted condition by a conventional rewind spring 20 provided in conventional manner within housing 21 on retractor side wall 13, a free end 22 of the rewind spring fitting into a slot 23 provided in the right hand end 24 of shaft 17 as seen in FIG. 3. The safety belt webbing 15 is thus normally biased into a wound or retracted condition by spring 20 when placed in use to restrain a vehicle passenger to the vehicle seat with which the retractor is associated.

In typical emergency locking retractors, as seen in FIG. 1, the seat belt webbing is free to protract or retract during movement of the vehicle passenger to be restrained by the webbing when an emergency condition exists. Various types of emergency locking mechanisms have been developed heretofore for preventing further protraction of the webbing when an emergency condition arises. In the exemplary emodiment of retractor of FIG. 1, such means includes locking means, indicated generally at 30, sensitive to changes in vehicle inertia for causing locking of the retractor. The retractor reel is provided with a pair of ratchets 31 and 32 with which a locking pawl 33 is adapted to interengage, and thus lock the retractor against further webbing protraction, upon activation by an associated inertia sensor means. In the exemplary embodiment, such inertia sensor means includes the provision of pendulum 34 suspended from a support bar 35 with a head portion (not shown) underlying a portion 36 of locking pawl 33 such that the locking pawl 33 is pivoted in side walls 12 and 13 into locking engagement with the ratchets 31 and 32 upon swinging movement of pendulum 34. A more detailed description of the operation of this type of vehicle inertia sensitive locking means may be found in U.S. Pat. No. 3,889,898 (Ziv), the disclosure of which is incorporated herein by reference.

As can be seen from the foregoing, during normal use of the safety belt retractor illustrated in FIG. 1, the tension of the rewind spring 21 acting through reel 16 on webbing 15 will be felt by the passenger about whom the webbing is placed during normal use since the retractor locking mechanism is activated to lock the reel only during an emergency condition. As is particularly contemplated by the present invention, belt tension reducing means are provided in the exemplary embodiment of retractor disclosed herein in order to reduce the tension applied by the safety belt to the vehicle passenger when the belt is in normal use about the passenger. In the exemplary embodiment, such belt tension reducing means are provided within the housing 41 mounted to the left hand side of the retractor as seen in FIG. 1.

Referring now to FIGS. 2 and 3, a preferred exemplary embodiment of belt tension reducing means, in accordance with the present invention, will be explained in detail. The exemplary belt tension reducing means is indicated generally at 40 and may be located within the aforesaid housing 41 on the left hand side of the retractor adjacent side wall 12, as seen in FIG. 3, to co-operate with the webbing storage reel 16 as hereinafter explained. As specifically contemplated within the present invention, the belt tension reducing means indicated generally at 40 comprises counterbiasing means for biasing reel 16 in a belt unwinding or protraction direction when connected thereto and means for releasably connecting the counterbiasing means to the reel.

Counterbiasing means, in the exemplary embodiment, comprise the provision of coil spring 42 having an inner end 43 held in fixed stationary position relative to the retractor through its engagement and retention in slot 44 formed in boss 45, the latter being an integral portion of housing 41 fixed to side wall 12 in conventional manner. An outer end 46 of spring 42, as best seen in FIG. 2, is secured to pawl carrier 50 (described hereinafter) via slot 51.

Means are provided for releasably connecting the counterbiasing means, including spring 42, to the belt storage reel 16 in order to reduce the tension of rewind spring 20 when the safety belt webbing 15 is placed into a position of use in association with the passenger. In the exemplary embodiment, such releasable connecting means includes the provision of ratchet means 60, pawl means 70 for engaging the ratchet means and pawl carrier means 50, the latter carrying pawl means 70 and being biased by the counterbiasing means spring 42.

Ratchet means 60 is connected to reel 16, as best seen in FIG. 3, for rotation therewith. Hub 61 fits about a reduced diameter portion 62 of shaft 17 and has a spline 63 fitted into a groove 64 of shaft portion 62 to cause concurrent rotation of the ratchet means 60 with reel 16. Ratchet means 60 is further provided with ratchet teeth 65 which face in the direction of movement of the reel during a rewind rotation thereof as seen in FIG. 2.

Pawl means 70 as seen in FIG. 2, comprises a body 71 pivotally mounted at one end on pivot pin 72 which is secured to pawl carrier means 50. An opposite free end of body 71 is provided with pawl tooth 73 adapted to engage with the individual teeth 65 of ratchet means 60 when allowed to do so as hereinafter explained.

Pawl carrier means, in the exemplary embodiment, includes the pawl carrier 50 which comprises an inner hub portion 52 having a central aperture 53 by which carrier 50 is rotatably mounted on boss 45, the pawl carrier thus being rotatably mounted relative to the retractor. As best seen in FIG. 3, the exemplary pawl carrier 50 has a disc-like body 54 and an integrally formed laterally extending annular boss 55. Counterbiasing means spring 42 is positioned within the cavity formed within boss 55 adjacent the inner surface of housing 41 and, as noted briefly hereinbefore, has its free end 46 engaging pawl carrier 50 through a slot 51 formed in the side wall of boss 55, as best seen in FIG. 2. Pawl carrier 50 is thus normally biased about its rotative mounting on housing boss 45 in a clockwise direction, when viewed in FIG. 2, which tends to promote protraction of the webbing against the bias of rewind spring 20 when the pawl carrier 50 is connected by the mating of pawl means 70 with ratchet means 60 to reel 16.

Pawl deactivating means are provided in accordance with the present invention for normally preventing pawl means 70 from engaging teeth 65 of ratchet means 60 during normal winding and unwinding of webbing 15 as is required to protract it to a position of use and subsequently retract it to a position of storage. In the exemplary embodiment, such pawl deactivating means comprises the provision of a frictionally driven cam disc 80 having camming means for holding pawl means 70 in a deactivated position until it is desired that the pawl means be allowed to interlock with ratchet means 60. As seen in FIG. 3, the exemplary cam disc 80 comprises a body portion 81 having a central aperture 82 by which it is freely rotatably mounted about hub 61 of ratchet means 60. Disc body 81 has a rear annular recess 83 into which a compression spring 84 is fitted, an inner end of spring 84 abutting retractor side wall 12 about bushing 18. Cam disc 80 is biased by spring 84 against an inner side surface 66 of ratchet means 60 to be frictionally driven in either rotative direction in response to like movement of ratchet means 60 which is connected to reel 16. As seen in FIGS. 2 and 5, cam disc 80 has camming means, indicated generally at 85, for co-operating with a cam follower pin 74 provided on pawl means 70 to control positioning of pawl means 70 relative to ratchet means 60 in response to belt movement as hereinafter explained. Preliminary thereto, it should be observed that the rotative travel of cam disc 80 under the frictional drive of ratchet means 60 is limited by disc limit pin 90 which is adapted to be abutted by disc stop surfaces 91 and 92, respectively, formed in a relieved arcuate portion 93 of disc 80. Also, the rotative travel of pawl carrier means 50 is also limited by pawl carrier stop 100 which is positioned to be abutted by pawl carrier stop faces 101 and 102, respectively, formed in a recessed arcuate portion 103 of the pawl carrier means. Limit stop 100 may be formed integrally of housing 41, as seen in FIG. 3 while limit pin 90 may be mounted to the retractor side wall 12 as seen in FIG. 4.

MODE OF OPERATION

Upon an initial protraction or unwinding of webbing 15 from the retractor reel, as illustrated in FIG. 5, the clockwise rotation of ratchet means 60, as viewed in FIG. 5, frictionally drives cam disc 80 in a clockwise direction until stop face 91 abuts stop pin 90. Such movement of cam disc 80 places cam surface 86 beneath cam follower pin 74 to hold pawl means deactivated during further unwinding or protraction of the webbing into a position of use. During this initial protraction of the webbing, when pawl means 70 is deactivated, the clockwise bias of spring means 42 upon pawl carrier means 50 causes it to be retained against stop pin 100 as seen in FIG. 5.

After the seat belt has been protracted to a position of intended use, a slight retraction movement of the webbing, as illustrated in FIG. 6, causes a counter clockwise rotation of cam disc 80, under the influence of the aforedescribed friction drive from ratchet means 60, to place the recessed cam surface 87 of the camming means, indicated generally at 85, beneath pawl means 70 which allows the latter to pivot about its mounting pin 72 into engagement with ratchet means 60. On a still further retraction of webbing 15 under the influence of rewind spring 20, pawl means tooth 73 engages against the aligned tooth of ratchet means teeth 65, as seen in FIG. 7, to interconnect the reel 16 to the counter balancing spring 42 via ratchet means 60, pawl means 70 and pawl carrier means 50. The resultant belt tensioning effect on the passenger is thus reduced by the counterforce of spring 42 acting against the force of rewind spring 20 for a limited amount of belt travel when the tension reducing means is in the condition illustrated in FIG. 7.

Figure 9:
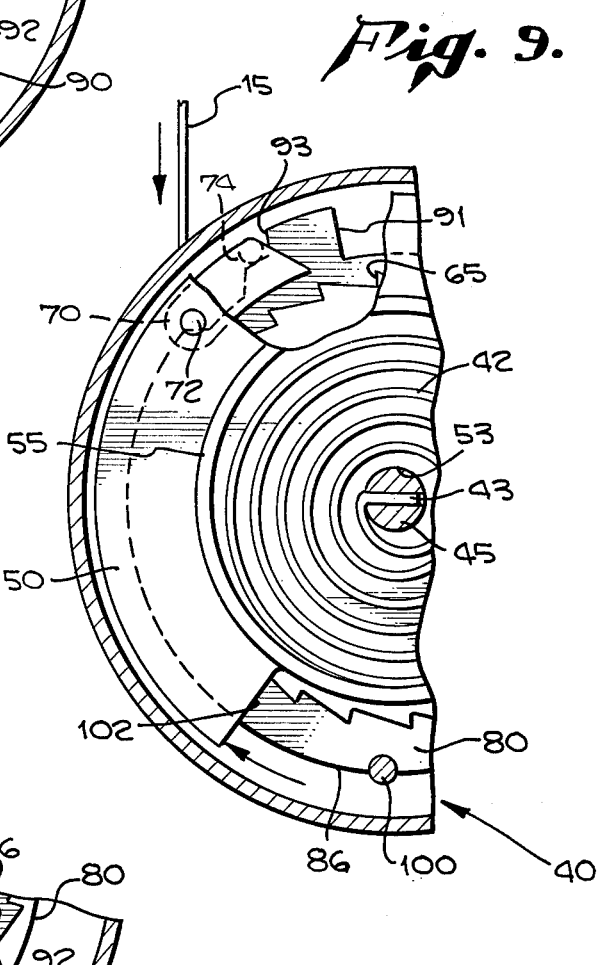
FIG. 9 is a view as in FIGS. 5 through 8 showing the exemplary embodiment of belt tension reducing means in deactivated position during a rewinding or retractive movement of the safety belt webbing beyond the condition of FIG. 8 toward a full rewind or retraction condition for the safety belt webbing as seen in FIG. 2.
Figure 8:
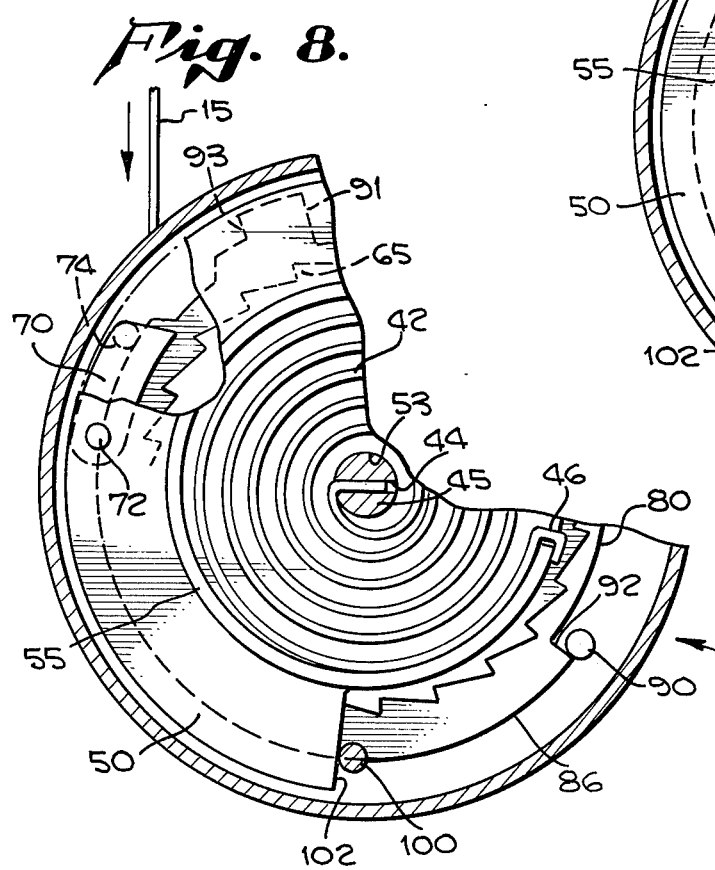
FIG. 8 is a view as in FIG. 7 showing the exemplary belt tension reducing means deactivated due to a retractive or rewinding movement of the safety belt webbing of more than the predetermined amount.

The belt tension reducing means of the present invention is activated for only a limited extent of belt movement as indicated by the reel movement from the position of FIG. 6 to that of FIG. 8. On the beginning of the initial retraction motion of webbing 15 in FIG. 6, cam disc 80 moves initially to place recessed cam surface 87 beneath the pawl follower 74 and then continues in counterclockwise movement on further belt retraction until disc stop face 92 abuts stop pin 90 as seen in FIG. 7. On still further belt retraction, as seen in FIG. 8, and with cam disc 80 held stationary by pin 90, continued counterclockwise rotation of ratchet means 60 drives pawl carrier means 50 counterclockwise from the position of FIG. 7 to that of FIG. 8 whereby pawl means 70 is disengaged from the ratchet means due to the pawl follower pin 74 riding up upon disc camming surface 86. Pin 100 limits any further counterclockwise rotation of pawl carrier means 50 as would might otherwise occur due to its inertia. The tension reducing means is thus deactivated and pawl carrier means is turned clockwise under the influence of counter balance spring 42, as illustrated in FIG. 9 with pawl follower pin 74 passing over the recessed portion of the disc camming means until it engages against disc stop surface 93. The force of counterbalance spring 42 on pawl carrier means 50 causes the latter to continue its clockwise rotation when viewed in FIG. 9 to carry cam disc 80 along with it back to the position of FIG. 2 wherein carrier means stop face 101 engages against stop pin 100. The return of the pawl carrier means and cam disc 80 to the position of FIG. 2 occurs while a continued retraction of webbing 15 is accomplished to allow full rewind of the webbing, with the camming disc 80 and ratchet means 60 rotating in opposite directions overpowering the friction drive clutch arrangement therebetween. In this fully rewound condition, the tension reducing means is held in deactivated position by cam disc 80, and as seen in FIG. 2, until there is another protraction followed by a slight retraction movement of webbing 15 as described hereinbefore and illustrated in FIGS. 5 and 6, respectively.

From the foregoing, it can be seen by those skilled in the art that an improvement in belt tension reducing means has been disclosed and provided by the within preferred exemplary embodiment thereof in association with a typical exemplary emergency locking retractor. The vehicle passenger may manipulate the safety belt webbing 15 in normal manner to place the belt in use without the need for special manipulation of the webbing to activate the tension reducing means. Further, the present tension reducing means, by its construction and mode of operation, provides for a more simpler and economical accomplishment of the aforestated objects than heretofore attainable with prior art belt tension reducing means.

Having thus described a preferred exemplary embodiment of belt tension reducing means, in accordance with the present invention, it should be understood by those skilled in the art that various modifications, adaptations and alterations thereof may be made within the spirit and scope of the present invention which is defined by the following claims.

I claim

1. In a safety belt retractor having a belt storage reel biased toward a belt wound condition, an emergency locking means for preventing a further unwinding movement of said belt when it is unwound to a position of use and an emergency condition exists and a separately acting belt tension reducing means for reducing the tension on said belt when in use due to the rewinding bias of said reel, the improvement in said belt tension reducing means comprising the provision of:
counter biasing means for biasing said reel in a belt unwinding direction when connected thereto; and
means for releasably connecting said counter biasing means to said reel.

2. The improvement of safety belt retractor of claim 1 wherein said means for releasably connecting said counter biasing means to said reel comprises:
ratchet means connected to said reel for rotation therewith and having ratchet teeth facing in the reel rewind direction;
pawl means for engaging said ratchet teeth; and
pawl carrier means rotatably mounted on said retractor and mounting said pawl means for movement on said carrier relative to said ratchet teeth between ratchet teeth engaging and non-engaging positions and means for interconnecting said counter-biasing means and said carrier means.

3. The improvement in safety belt retractor of claim 2 wherein said counter biasing means comprises spring means interconnected between said pawl carrier means and a stationary portion of said retractor for biasing said pawl carrier means to move in a rotative direction opposite to the direction of rotation said ratchet means is biased toward due to its connection to said reel.

4. The improvement in safety belt retractor of claim 3 wherein said means for releasably connecting said counter biasing means to said reel further comprises;
pawl deactivating means for normally preventing said pawl means from engaging teeth of said ratchet means during winding and unwinding of said belt, said pawl deactivating means being operable upon a slight rewinding movement of the belt when the latter has been previously unwound to a position of use to allow said pawl means to engage with said teeth of said ratchet means for a predetermined limited extent of further rewinding movement of said belt whereby the belt tension of said reel bias on said belt when the latter is in use is reduced by the opposite bias of said counter biasing means during said limited further movement of said belt.

5. In a safety belt retractor having a belt storage reel biased toward a belt wound condition and an emergency locking means for preventing further unwinding of the belt when it is in use and an emergency condition arises, the improvement comprising the provision of:
belt tension reducing means for reducing the tension on said belt applied by the reel bias toward wound condition comprising spring means for urging said reel in an unwind direction when activated and means for activating said spring means upon a slight retractive movement of the belt after being unwound toward a position of use.

6. Safety belt tension reducing means for safety belt retractors having a belt storage reel and biasing means for normally biasing an said belt storage reel toward a belt retracted condition when the associated safety belt is protracted to a position of use, said tension reducing means comprising:
counter biasing means for biasing said reel in a belt protracting direction when connected to said reel;
means for releasably connecting said counter biasing means to said reel; and
means for automatically operating said means for releasably connecting to connect said counter biasing means to said reel upon a slight retractive movement of the belt following a protraction thereof.

7. The safety belt tension reducing means of claim 6 wherein said means for releasably connecting said counter biasing means to said reel comprises:
ratchet means connected to said belt storage means for rotation therewith;
pawl means for releasably engaging said ratchet means;
pawl carrier means rotatably mounted to said retractor and mounting said pawl means for movement relative to said carrier into and out of engagement with said ratchet means and for rotation with said carrier means relative to said retractor; and means for interconnecting said pawl carrier means and said counter biasing means whereby said counter biasing means acts through said pawl carrier means, pawl means and ratchet means when said pawl means engages said ratchet means to counter bias said reel.

8. The safety belt tension reducing means of claim 7 wherein said means for automatically operating said means for releasably connecting said counter biasing means to said reel includes means for disengaging said counter-biasing means from said reel automatically upon a protraction or retraction of said belt of an amount greater than a predetermined limited extent of belt movement following said slight retractive movement of said belt.

9. Tension relieving means for safety belt retractors having a belt storage means and biasing means for normally biasing said belt storage means toward a belt retracted condition when the associated safety belt is protracted, said tension relieving means comprising:
  pawl carrier means mounted to said retractor for movement independently of but in like directions of movement provided for said belt storage means during belt protraction and retraction;
  ratchet means associated with said belt storage means for movement therewith under the action of said biasing means;
  pawl means moveably mounted to said pawl carrier means for movement therewith and relative thereto between ratchet means engaging and disengaging positions;
  counter-biasing means for biasing said pawl carrier means in a direction of movement therefor counter to the direction of movement said storage means is biased by said biasing means; and
  means for operating said pawl means into engagement with said ratchet means whereby the counter biasing force of said counter-biasing means acts through said pawl carrier means, pawl means and ratchet means against the bias of said biasing means to produce a reduced retractive tension on said belt.

10. The tension relieving means of claim 9 wherein said means for operating said pawl means into engagement with said ratchet means includes means for normally maintaining said pawl means disengaged from said ratchet means during protraction and retraction movement of said belt and which provides for engagement of said pawl means with said ratchet means to produce the aforesaid reduced retractive tension on said belt in response to a slight retraction movement of said belt following a protraction of said belt toward a position of use.

* * * * *

Disclaimer 4,026,494.—*Akira Tanaka*, Northridge, Calif. SAFETY BELT TENSION REDUCING MEANS. Patent dated May 31, 1977. Disclaimer filed June 21, 1978, by the assignee, *American Safety Equipment Corporation*.

The term of this patent subsequent to May 31, 1994, has been disclaimed.
[*Official Gazette August 22, 1978.*]